United States Patent [19]

Levy

[11] 4,107,742
[45] Aug. 15, 1978

[54] METHOD AND APPARATUS FOR RECORDING GRAPHIC INFORMATION MAGNETICALLY

[76] Inventor: Sidney Levy, 145 W. Cuthbert Blvd., Oaklyn, N.J. 08107

[21] Appl. No.: 582,124

[22] Filed: May 30, 1975

[51] Int. Cl.² ............................................. H04N 1/28
[52] U.S. Cl. .................................... 358/301; 346/74.1
[58] Field of Search .......................... 178/6.6 A, 6.61; 346/74.1; 360/115, 116, 123, 125, 126; 358/301

[56] References Cited

U.S. PATENT DOCUMENTS

| | | | |
|---|---|---|---|
| 2,657,377 | 10/1953 | Gray | 360/116 |
| 2,933,555 | 4/1960 | Wooton | 178/6.6 A |
| 2,943,908 | 7/1960 | Hanna | 346/74.1 |
| 2,979,572 | 4/1961 | Levin | 360/116 |
| 2,996,575 | 6/1976 | Sims | 178/6.61 |
| 2,996,575 | 8/1961 | Sims | 178/6.61 |
| 3,110,764 | 11/1963 | Barry | 178/6.61 |
| 3,318,997 | 5/1967 | Camras | 360/116 |
| 3,550,149 | 12/1970 | Camras | 360/115 |
| 3,852,525 | 12/1974 | Ichioka et al. | 178/6.61 |
| 3,935,578 | 1/1976 | Condon et al. | 346/74.1 |
| 3,946,404 | 3/1976 | Berkowitz et al. | 346/74.1 |

Primary Examiner—Jr. Cardillo
Attorney, Agent, or Firm—Friedman, Goodman & Teitelbaum

[57] ABSTRACT

An imaging system is provided whereby graphic information from a source is magnetically recorded on a receiving surface. The imaging system comprises an arrangement for shaping a magnetic field to substantially linear configuration. A photo-responsive element is provided for varying the intensity of the magnetic field along the line in accordance with information contained in a corresponding line of the source of the original graphic information. An intermediary receiving surface is provided to receive the magnetic information and construct a magnetic image thereon. A toner supply is also provided in magnetically attractable relationship to the intermediary receiving surface for causing transfer of toner material from the supply to the intermediary receiving surface in a quantity corresponding to the variations of the magnetic field intensity on the intermediary receiving surface. Elements are also provided to transfer the toner image to a writing or final receiving surface where it is fixed to provide a graphic record of the original source material.

27 Claims, 12 Drawing Figures

U.S. Patent  Aug. 15, 1978  Sheet 1 of 3  4,107,742
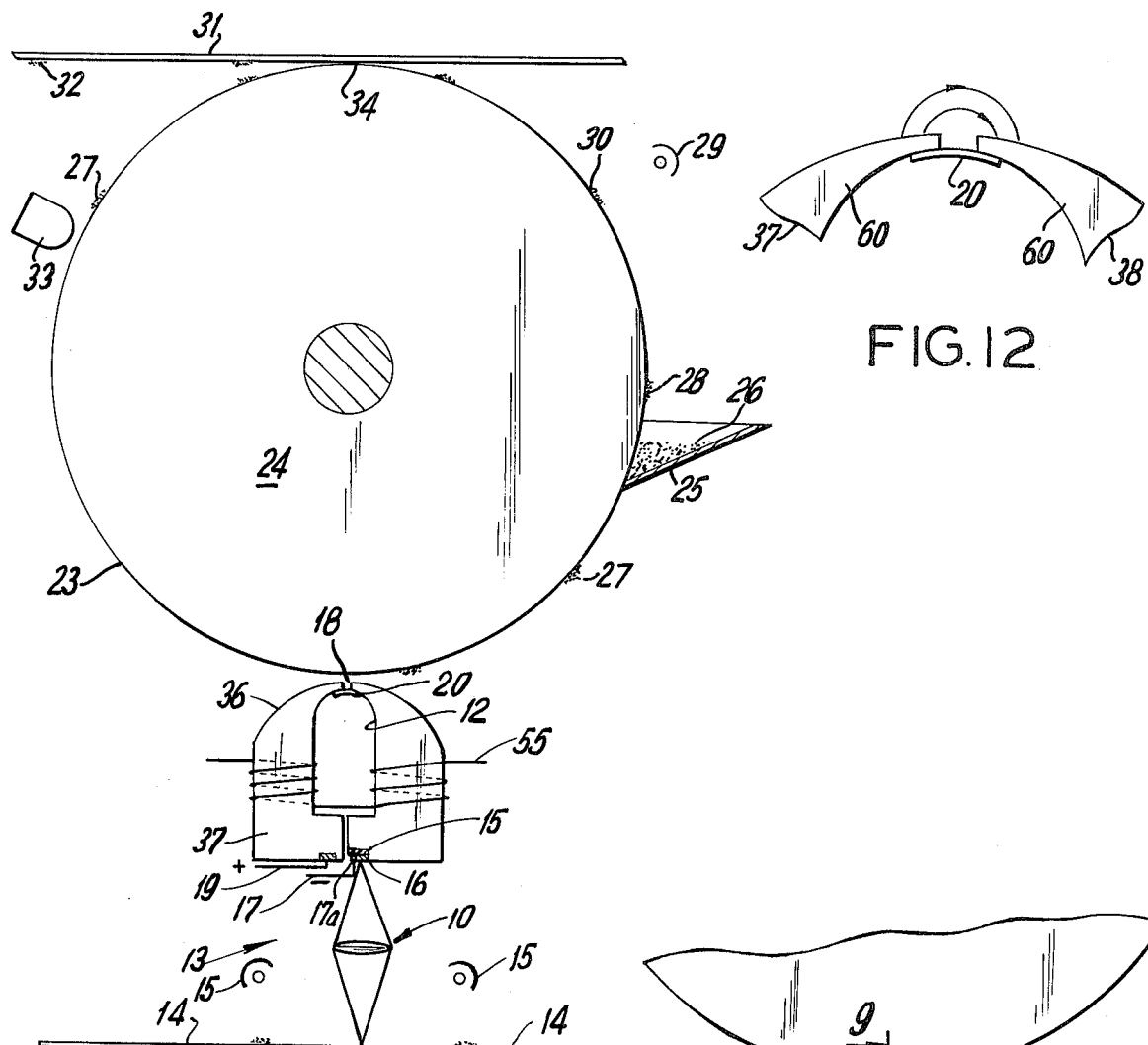
FIG. 12
FIG. 1
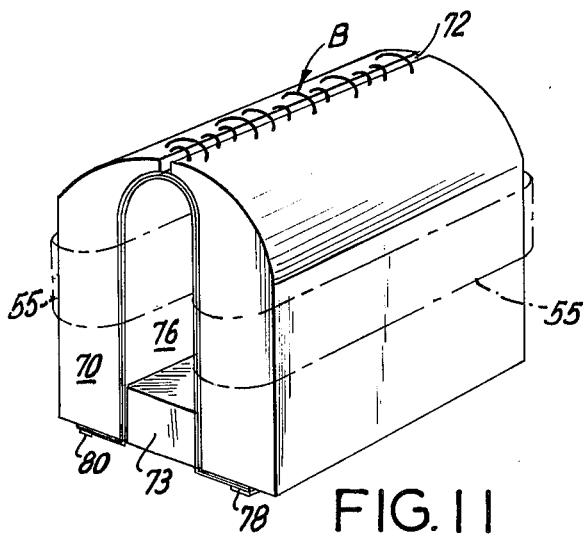
FIG. 11
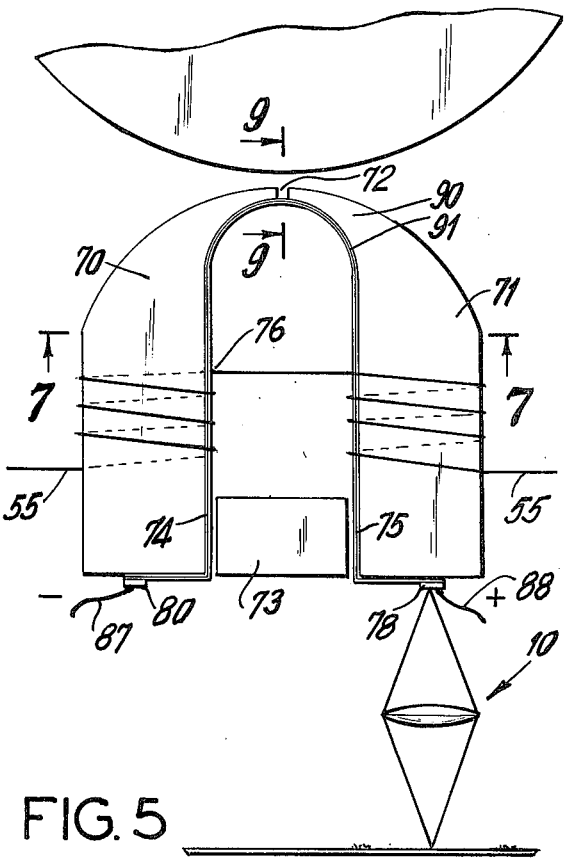
FIG. 5

METHOD AND APPARATUS FOR RECORDING GRAPHIC INFORMATION MAGNETICALLY

BACKGROUND OF THE INVENTION

1. Field of the Invention

The subject invention relates to the magnetic recording of images utilizing a linear magnetic field, the intensity of said field along said line being varied in accordance with graphic information source to be recorded so as to produce a line of recorded information, corresponding in a pattern of light and shade to the information source. Continuously, progressive recordation of lines of information is thus possible for producing an integrated record of the source material in a direction perpendicular to the linear magnetic field.

2. Description of the Prior Art

Magnetic imaging has been subject to investigation in recent years since the development of a successful and acceptable system is considered to have advantages over imaging techniques currently employed on a commercial basis. It has been felt that such techniques would avoid the expensive and potentially dangerous high voltage equipment now required in electrostatic xerography and related techniques. Such systems would also be desirable since it would avoid the use of chemical processing steps now required in photographic reproduction systems.

It does not appear that any satisfactory and commercially acceptable system has as yet been developed utilizing magnetic techniques.

SUMMARY OF THE INVENTION

Accordingly, it is an object of the present invention to provide an imaging system which avoids the problems of the prior art systems.

A further object of the present invention is to provide an imaging apparatus which progressively magnetically records graphic information from a source onto a receiving surface on a line by line basis.

Still a further object of the present invention is to provide an imaging apparatus which shapes a magnetic field to substantially linear configuration and varies the intensity of the magnetic field along the line in accordance with information contained in a corresponding line of the source of original graphic information.

A further object of the present invention is to provide an imaging apparatus which utilizes a unique copying head to form a shaped magnetic field of a substantially linear configuration, so that variations in the magnetic field intensity correspond to the information contained in a source of graphic information.

Still another object of the present invention is to provide an imaging apparatus utilizing magnetic techniques to record graphic information on to a receiving surface, by transferring toner material onto the receiving surface in a quantity corresponding to variations in the magnetic field intensity.

A further object of the present invention is to provide a method for recording graphic information from a source of information on to a receiving surface by varying the intensity of linear magnetic field in accordance with a line of information from the source an using magnetic techniques to record the variations on a receiving surface.

Yet another object of the present invention is to provide a unique method of making plural copies from information magnetically recorded on an intermediary receiving surface after having the information recorded thereon by one cycle of the recording process.

A still further object of the present invention is to provide a unique system whereby the intermediary receiving surface can be transferred to a separate device to produce multiple copies and in effect be used as a printing press.

These and other objects, features, and advantages of the invention, will, in part, be pointed out with particularity, and will, in part, become obvious from the following descriptions of the invention, taken in conjunction with the accompanying drawings which form an integral part thereof.

Briefly, the invention describes an imaging apparatus for recording graphic information from an original onto a receiving surface, comprising means for providing a controlled magnetic field. A shaping means shapes the magnetic field into a substantially linear configuration. A magneto-optic means varies the intensity of the magnetic field along the line, in accordance with information contained on a corresponding line of the original graphic information. Toner supply means is positioned in juxtaposition to the intermediate receiving surface so that toner material may be attracted to the intermediate receiving surface in conformance with the information contained thereon. The information contained in the lines of magnetic information is successively imprinted on the intermediate receiving surface which is a magnetizable surface medium such as a magnetic recording oxide layer on a belt or drum or a magnetic plating on a suitable belt or drum. The toner deposited on the intermediary receiving surface in conformance with the information contained thereon is transferred to the final receiving surface to produce a graphic record of the information generated by the magneto-optic means on the linear magnetic field.

The invention also describes the method for recording the graphic information from the original onto the final receiving or writing surface. Also described is the toner supply means and the means for fixing the image on the final receiving surface.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 is a schematic drawing of an apparatus in accordance with an embodiment of the present invention;

FIG. 5 is an elevation view of another embodiment of the head;

FIG. 11 is a perspective view of the head showing how the magnetic field varies along the gap line; and FIG. 12 shows the shape and direction of the magnetic field in the gap of the recording head shown in FIGS. 2 and 4.

DESCRIPTION OF THE PREFERRED EMBODIMENT

Figure 2:
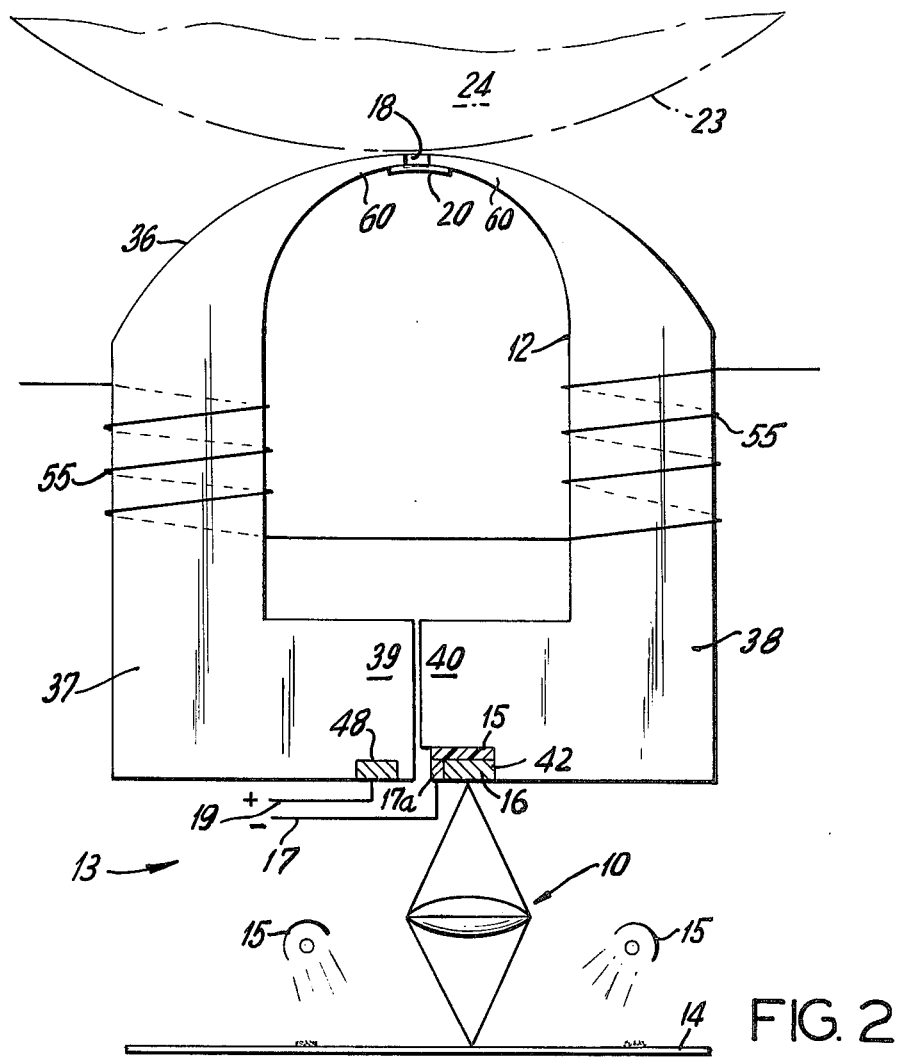
FIG. 2 is an elevation view of the recording head shown as part of FIG. 1.

Referring now to the drawings, FIG. 1 illustrates generally and FIG. 2 more particularly an embodiment of the present invention wherein an optical system 10 is utilized for activating a recording head 12 embodying significant features of the present invention. A line of graphic information appearing on a sheet of source material 14 is illuminated by the illuminating source 15 and optically focused on a photo responsive element 16 which is in electrical contact with the laminar structure comprising the recording head 12. As will hereinafter be more particularly described, the arrangement is such that the laminar stack comprising the recording head is magnetically energized to produce a shaped magnetic field of uniform intensity along a line defined by the tips of the laminae at the gap 18. Variations of light and shade optically derived from a line of the graphic source material 14 are focused upon the photo-responsive material 16. The laminae comprising the stack are of a conventional horseshoe configuration commonly used in magnetic recording head and the body portions of adjacent laminae are electrically insulated from each other. A source of electrical current 13 is connected to the photo-responsive element so as to provide for the passage of current from the source terminal 17 through said photo-responsive element and each of the individual laminae 36 comprising the stack, across the gap 18 by means of discrete non-magnetic conductive elements 20, and thence through the other leg of each of the laminae, to a common terminal 19. The confronting faces of the laminae are electrically insulated from each other as shown at 41 in FIG. 4. As a consequence of this arrangement, each of the laminae is connected in a series circuit with the current source through the photo-responsive element and an associated non-magnetic discrete conductive element 20. The laminae are in a parallel circuit arrangement with respect to each other.

As a consequence of this arrangement, the amount of current flowing through the body of each of the laminae is determined by the degree of illumination of the portion of the photo-responsive element associated therewith and varies from point to point along the line defined by said photo-responsive element in accordance with the pattern of light and shade corresponding to the source material. As will hereafter more particularly be pointed out, the current flow through each of the laminae increases the magnetic reluctance thereof and results in an overall diminuation of the magnetic field in the gap region. As a consequence of this arrangement, a magnetic record of the variation of light and shade in the original source material is made in the magnetizable surface layer 23 of the drum 24. As the original source material 14 is moved from left to right and the drum 24 is synchronously rotated counterclockwise, as shown in FIG. 1. A magnetic record of the information contained on the original source material is made on the magnetizeable layer 23. As the drum 24 rotates, it passes through a toner supply 26 containing a magnetically attractable toner material 25 which attracted to and held by the magnetic pattern 27 in the magnetizeable surface layer 23 as shown at 28. The toner supply may be any suitable arrangement for maintaining a supply of magnetically attractable power material in sufficient proximity thereto for attraction by the magnetized areas. Conventional transfer methods of transfer of the toner material to a final receiving surface may be utilized as by pressure transfer or by means of magnetic attraction through the receiving sheet. A novel transfer arrangement is shown wherein a liquifiable toner material is utilized. The toner pattern on the intermediate receiving surface passes by an infra-red heating source 29 which liquifies the toner as shown at 30 and the liquified toner pattern is transferred to the final receiving surface 31 at 34 by wetting action to produce the graphic record by the toner pattern 32 on the receiving surface 31. The magnetic record 27 in the magnetizeable surface layer 23 is removed when desired by passing by the erase head 33. The magnetizeable surface layer 23 is then ready to receive new information.

Figure 3:
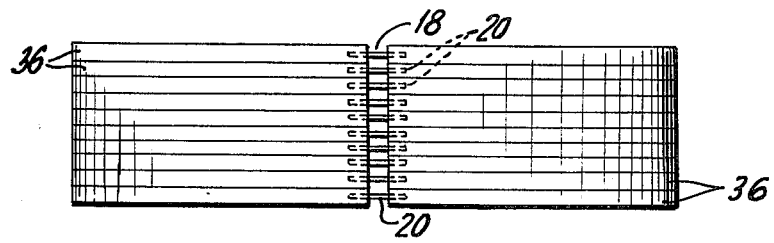
FIG. 3 is a plan view of the head shown in FIG. 2.
Figure 4:
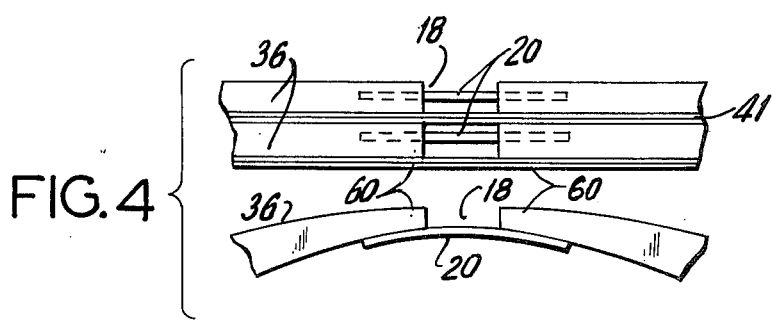
FIG. 4 are detail views in plan and elevation respectively of the gap portion of the head shown in FIG. 2.

A recording head in accordance with the present invention designated generally by the numeral 12 is comprised of a plurality of laminations 36 assembled to form a stack as shown in FIGS. 3 and 4.

Said laminae are each formed of a relatively thin sheet of magnetically permeable electrically conductive material, each laminae comprise two symmetrical legs 37 and 38 which form a horseshoe element, see FIG. 2. The two legs of each of the laminae are bridged at the gap section 18 by means of an associated discrete non-magnetic conductive element 20 for providing magnetic isolation and electrical conductivity across the gap for each of the laminae. The ends 39 and 40 of the legs 37 and 38 respectively are in close physical proximity to each other but electrically isolated. The laminae are also electrically insulated from each other in the stack by means of the interleaved insulating layers 41 shown in FIG. 4.

In the embodiment shown in FIG. 2, the laminae are each provided with a recessed portion 42 forming a channel extending the length of the head within which the photo-responsive element 16 is received. The photo-responsive element 16 and the legs are serially connected to a source of electrical energy by means of positive and negative terminals connected to the photo-responsive element 16 and a bus bar 48 respectively. The photo-responsive element and bus bar are advantageously unitary structures extending along the total length of the stack of laminations and make electrical contact with all of the laminations of the stack along an associated leg so that a single connection to the source of electrical energy suffices for each set of leg portions. A strip of insulating material extends along the entire length of the stack and insulates the coextensive pad or bus bar 17a from contact with the stack so that current will flow from the source 17 through the bus bar and thence through photo-responsive element 16 by contact with edge of the laminations along the edge of recess 42.

As hereinbefore described the individual laminae are electrically insulated by means of interposed insulating layers 41. The stack of laminations may be conveniently assembled by the use of adhesives such as an epoxy resin to form a unitary structure. The insulating layer may be a dielectric film such as a polyester material or it may be a coating of an electrically insulating varnish.

The laminae forming the stack are made of a magnetically highly permeable material, such as silicon iron, or a high permeability nickel alloy. The resolution of the magnetic field imaging apparatus depends upon the thickness of each of the laminations in the stack and their interposed insulation. The photo-responsive element may comprise a bar of crystalline material or a deposited layer of photo-responsive material produced by vacuum, thin film techniques. The photo-responsive element is preferably one which has high conductivity in one direction, and this preferred direction of conductivity is such that it is in the plane of the laminations. Such a material can be, by way of example, a single crystal cadmium sulfide material which is properly doped. Alternately, it can be a silicon photo-conductor or photo-transistor material. Another alternative would be vacuum deposited layers of these and similar materials. The structure can be a single photo-responsive element in electrical contact with all of the laminations forming the recording head or if desired, a plurality of photo-responsive elements may be utilized each of which is electrical contact along one of its surfaces with one of the laminae.

The stack or head is magnetized to form the desired shaped linear magnetic field along the gap at the tip portion of the head. This may be accomplished by suitably magnetizing the stack as a whole or each of the laminae may be produced permanently magnetized individually. Alternatively, the stack as a whole may be magnetized as by passing a suitable current through a coil 55 surrounding the body portion of the stack, as shown schematically in FIGS. 1 and 2. The magnetic energizing coil may be fed by direct or alternating current, or by pulsed current of suitable waveform. It should also be noted that the photo-responsive element need not be disposed in the recess 42 but may be deposited on the surface of one side of the head so long as a series current path is provided which leads from the photo-responsive element to laminae along one leg of the stack, through the non-magnetic conductive bridge portion 20 and through the other leg to the opposing terminal.

The magnetic field producing means, whether by permanent magnetization or by a magnetizing coil around the stack is substantially restricted to produce a linear magnetic field in the gap extending the length of the stack.

As hereinbefore indicated, the photo-responsive element 16 is part of a series circuit, which permits current to pass from one terminal 17 connected to the current source through a light activated portion of the photo-responsive element 16, along one leg 38 of the head laminae in contact with said activated portion, across the gap 18 by means of the non-magnetic conductive portions 20 back up the other leg 37 of the head to the other terminal 19 connected to the current source. This current source may be a direct current source, alternating current source, or a pulsed current source of suitable wave form. The photo-responsive element 16 is such that it permits passage of high current in the areas where it is illuminated, while producing a relatively weak current in the areas of little or no illumination. The current from the source 13 passes through the photo-responsive element 16 and then passes in parallel relation through each of the electrically conductive laminae in contact with said illuminated portion. Those laminae in contact with or connected to the portions of the photo-responsive element which are highly illuminated will therefor carry a higher current than those laminae in contact with or connected to the portions of the photo-responsive element which are not as highly illuminated. The current in each of the laminae must pass through the restricted tip portions 60 of each laminae. The current density is very high in the tips of those laminae corresponding to high illumination, and is low in those laminae corresponding to low illumination. The magnetic field produced by the high current density is at right angles to the magnetic field produced by the shaped magnetic field producing means heretofore described. The magnetic field produced by the current in the laminae magnetically saturates the material and effectively reduces the incremental permeability of the shaped magnetic field to unity since the lamaine are of a suitably characterized magnetically permeable material. The degree and extent of saturation is related to the current level controlled by the associated portion of the photo-responsive element under image illumination. The result is that the magnetic reluctance of each of the laminae corresponding to a high illumination level on the photo-responsive element is increased particularly at the tip portions thereof, and the magnetic field at the tips of these laminae is sharply reduced. As a consequence, the variations of light and shade of the image source viewed through the optical system is reproduced as a corresponding varying magnetic field along the scan line at the gap in the laminations. This field varies along the scan line in accordance with the light and shade pattern of the image on the source material and it is transferred to the magnetizeable layer 23 on the drum 24. As the source material is moved past the optical system 10 focal point 61 and the drum 23 is moved in synchronization therewith a magnetic image corresponding to the information on the source material 14 is produced in the magnetizeable surface layer 23.

The magnetic image 27 in the magnetizeable surface layer 23 is moved past a toner supply 26 containing a toner powder 25 as the drum 24 rotates in synchronization with the movement of the source material 14. The toner may be a material comprising a low melting resin or wax containing magnetic material such as a magnetic iron oxide and it is selectively attracted to portions of the magnetic image 27 in proportion to the extent of magnetization and thus produces a toner image 28 corresponding to the magnetic image 27 on the magnetizeable surface. The toner image is heated to the melting temperature of the resin or wax by means of a heating source 29 such as in infra red heater. Alternatively a high frequency electrical field may be applied to melt the toner. The melted toner is then contacted to the surface of the receiving surface 31 and is adhered thereto by attraction forces such as adhesion or wetting. Contact with the cold receiving surface will set the toner by cooling.

Figure 6:
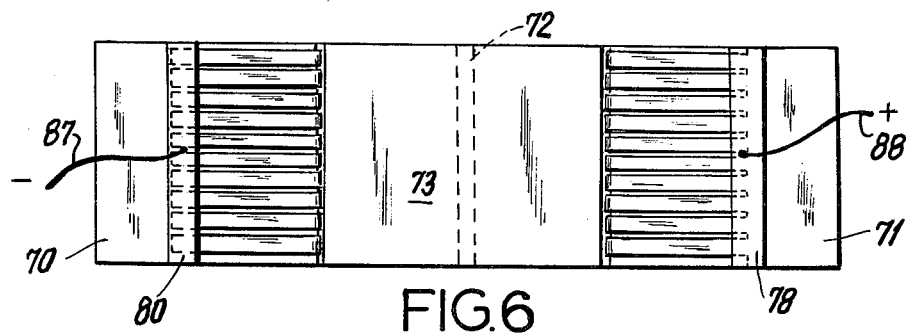
FIG. 6 is a bottom view of the head shown in FIG. 5.
Figure 8:
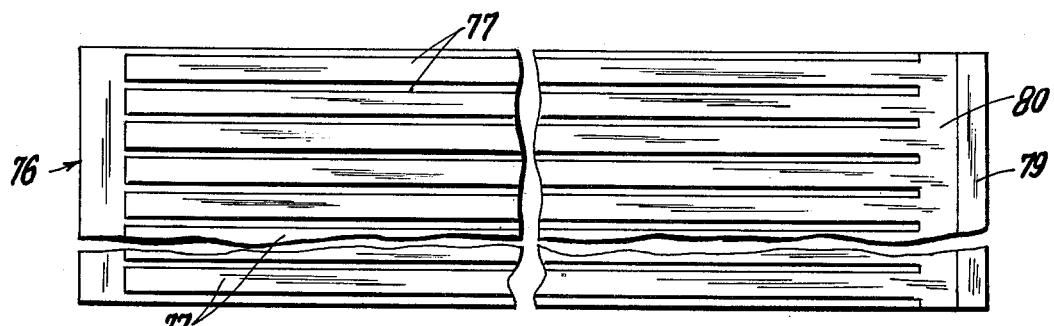
FIG. 8 is a developed view of the element that makes up the conductor structure of the head structure shown in FIG. 5.

The head shown in FIGS. 5 and 6 is another embodiment of the present invention. It comprises a symmetrical set of pole pieces 70 and 71 which may be a stack of laminae or alternatively, a solid ferrite pressing or a cast metal part of suitable magnetic properties. The two pole pieces are joined at the point remote from the gap by a transverse element 73 made of the same material as the pole pieces 70 and 71 in a manner to provide two passages apertures 74 and 75. A conductive structure 76 comprising a large number of parallel conductor fingers 77 supported on a thin insulation film 79 is shown in developed form in FIG. 8. The conductors terminate in a transverse shorting pad 80 at one end and an overlying photo-responsive element 78 at the other end as shown in FIGS. 5 and 6. This structure is fitted to the interior walls of the pole pieces 70 and 71, extends across the gap 72 and exits the interior of the head through the passages 74 and 75 between the pole pieces 70 and 71 and the connecting element 73. The shorting pad 80 is affixed to the structure at one pole piece and the photo-responsive element 78 is affixed to the structure at the other pole piece as shown at 78. The conductor structure is electrically insulated from the magnetic material.

The recording head is magnetized to form the desired shaped linear shaped magnetic field extending along the gap 72 at the tip of the head. This may be accomplished by suitably magnetizing either the pole pieces 70 and 71 or the connecting element 73 or by magnetically energizing the head as a whole as by passing a suitable current through a coil 55 surrounding the pole pieces, as shown schematically in FIG. 5. The magnetic energizing coil may be fed by direct current, alternating current, or by pulsed current of suitable waveform.

The magnetic field producing means, whether it be by permanent magnet magnetization of the head parts, or by a magnetizing coil passing current around the pole piece, is substantially retricted to the gapline extending the length of the head.

Figure 7:
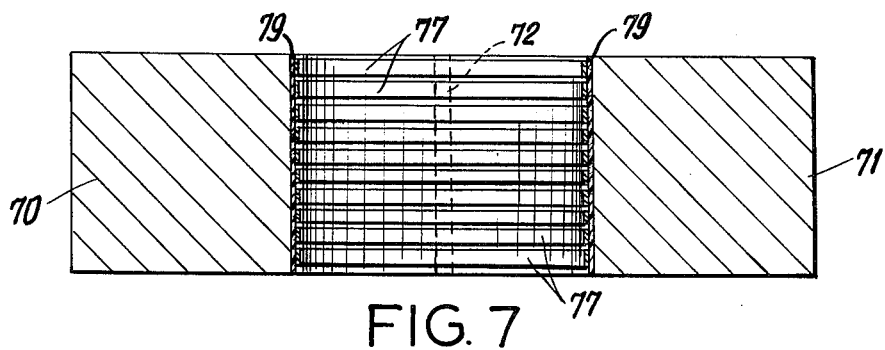
FIG. 7 is a sectional view taken alone line 7—7 of FIG. 5.
Figure 9:
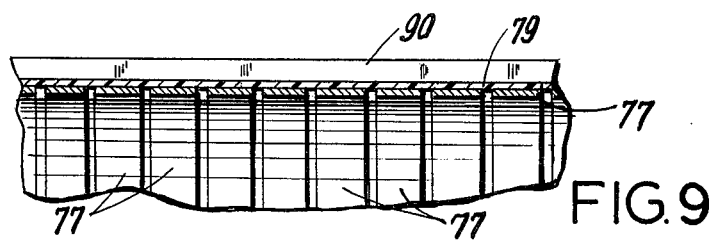
FIG. 9 is a sectional view taken across the gap in FIG. 7.
Figure 10:
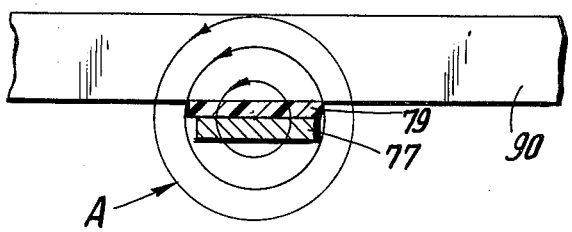
FIG. 10 is an enlargement of one of the conductor elements shown in FIG. 9 showing the magnetic field generated by the current flow in the conductors.

The conductor structure which is adhered to the interior portion of the pole pieces forms a parallel set of electrical circuits, the terminations of which are connected to a current source. The current flows from terminal 88 through an activated portion of the photo-responsive element 78 along the correspondingly located conductors 77 across the head gap 72, back to the shorting pad 80 and thence to the opposite terminal 87 of the current source. The thickness of the magnetic material of the pole pieces is small at the gap portion producing a restricted cross section of material for the magnetic circuit. As a consequence the material can be readily saturated magnetically. It can be seen by reference to FIG. 9 which is a cross section view of the gap in FIG. 7 and more particularly to FIG. 10 which is an enlargement of FIG. 9 current flowing in the conductors 77 will produce a magnetic field at right angles to the shaped magnetic field in the magnetic material of the pole pieces tips at 90 and 91 as indicated at A. The magnetic field produced by the current flow will saturate the magnetic material in the portion adjacent to the conductors 77 and reduce the incremental permeability to one with a sharp increase in the reluctance of the magnetic circuit and a corresponding sharp reduction in the magnetic field strength of the linear magnetic field in the gap 72 in proximity to the conductor carrying the high current.

As has heretofore been indicated, the photo-responsive element 78 is, part of a series circuit, which permits current to pass through the light activated areas thereof to associated conductors 77, across the gap portion 72, to the return portion of the circuit, and the other terminal of the current source. The current source may be a direct current, an alternating current, or a pulse current of suitable waveform. The photo-responsive element is such that it permits the passage of high currents in the areas where it is highly illuminated while producing weak currents in areas of little or no illumination. The current from the source passes through the activated portions of the photo-responsive element 78 and then passes in parallel relationship through each associated conductor strip 77 in proximity to the head pole pieces. Those conductor strips connected to portions of the photo-responsive element which are highly illuminated will therefore carry a higher current than those strips connected to the portions of the photo-responsive element which are not as highly illuminated by portions of the line image focused thereon from the source material 14 through the optical system 10. The current thus produced in each of the strips 77 must pass in proximity to the pole tips 90 and 91. Where the current in the strips is high it produces a strong magnetic field in the adjacent magnetic material at right angles to the shaped magnetic field produced by the shaped magnetic field producing means heretofore described. The magnetic field produced by the current flow locally saturates the material of the pole pieces, the pole pieces being made of a magnetically permeable material of suitable characteristics. The degree and extent of the saturation is related to the current level controlled by the associated portion of the photo-responsive element under image illumination. The result is that the reluctance of the magnetic material adjacent to each of the conductive strips corresponding to high level illumination is increased particularly at the tip portion of the pole pieces, and the shaped magnetic field at the tip of this portion of the pole piece is sharply reduced. As a consequence the variation of light and shade of the image source material viewed by the optical system 10 is reproduced as a magnetic field along the scan line at the gap 72 as indicated by the lines B in FIG. 11. This field is transferred to the magnetizable layer 23 of the drum 24 in the same manner as hereinbefore described to be converted into a graphic record in the same manner as was described for the previous head embodiment.

The body of the head portion is made as hereinbefore stated from suitable magnetic materials such as a stack of laminations, a ferrite pressing or a casting of a suitable magnetic alloy. The conductive strips 77 may be conveniently made by etching a pattern of conductors 77 on a copper clad sheet or film 79 of electrically insulating material such as Mylar or Kapton film which are well known materials by well known photo-resist techniques. The photo-responsive element may be conveniently applied to the conductive element structure 76 by vacuum deposition techniques and it would be the same materials as indicated for the previous head embodiment such as cadmium sulfide or a silicon material which is either a photoconductive or a phototransistor material.

The original source material is progressively copied by the system in full width and the image is reproduced onto the final receiving means. Accordingly, as indicated the apparatus is equipped with a driving means which synchronously drives the original and the drum as well as the final receiving means. The original and the receiving means are shown moving in opposite direction to correspond with the optical system shown but it is possible for convenience of construction or operation to have them move in the same direction by the use of a somewhat different optical system.

The optical system can be either one which focuses only a single line of the original information onto the photo-responsive element, or alternatively, the system can focus an entire areas of the original source material. However, the photo-responsive element in such a case should be narrow enough to receive a single line of the original information or a suitable arrangement such as a slotted mask may be provided for this purpose. A single line of information is thus transferred to the magnetizeable surface material 23 and the magnetic image is generated on the drum surface by progressively exposing the line after line of the original copy to the optical system and transferring the information by the magneto-optical head to the drum surface.

The essential characteristic of the invention is the provision of means for shaping a magnetic field and further providing electrical means for varying the intensity of said magnetic field along said line, which line by line progressively forms a recorded image on a receiving surface corresponding to the pattern of light and shade of the original source material. The magnetic field is generated parallel to the intermediate receiving surface of the magnetizeable layer on the drum and the magnetic image is progressively generated by passing the intermediate receiving surface across the line of magnetic information. The intensity of the magnetic field is varied along the line by altering the reluctance of the magnetic circuit by passing a current through or adjacent to the thinned out portions of the head pole pieces in proximity to the gap. The amplitude of said current is determined by a photo-responsive element responsive to the illumination produced by the light and shade pattern of the original source material to be copied. The reluctance of the magnetic circuit is caused to change in response to the current level by causing magnetic saturation of the magnetic materials in varying degrees as a result of the magnetic material field generated by the current flow.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An imaging apparatus for recording graphic information from an original onto a receiving surface, comprising:
   (a) means for providing a magnetic field;
   (b) means for shaping the magnetic field to a substantially linear configuration to provide a line with a uniform magnetic intensity throughout its length for any instant of time; said shaping means including a copying head having a plurality of electrically conductive and magnetically permeable laminae electrically insulated from each other to define a stack of said laminae having a first terminal and a second terminal, each of said laminae having a gap therein between said terminals bridged by an electrically conductive and non-magnetic material, said line being disposed along said gap;
   (c) electrical means connected to said first and second terminals for varying the intensity of portions of the magnetic field along said line to provide magnetic information in accordance with information contained on a corresponding portion of the original graphic information; and
   (d) surface means positioned adjacent to said gap in magnetic coupling relation to said linear configuration of said magnetic field for recording thereon the magnetic information contained along said line and for producing thereon a magnetic image corresponding to the original graphic information, said surface means further attracting thereto a toner material and transferring the toner material to a receiving surface in quantity corresponding to variations of light and shade in the original as provided by magnetic field intensity variations along said line.

2. The apparatus as in claim 1 and wherein said toner material comprises a magnetically attractable material in a low melting resin or wax base, and means for bringing said toner material into attractable relationship with said surface means.

3. The apparatus as in claim 1 and wherein said means for providing the magnetic field includes said laminae being permanently magnetized.

4. The apparatus as in claim 1 and wherein said means for providing the magnetic field includes a magnetic energization member.

5. The apparatus as in claim 4 and wherein said magnetic energization member comprises electrically energized coil means wound on said stack.

6. The apparatus as in claim 1 and including means for holding and delivering a regulated supply of said toner material to the surface means.

7. The apparatus as in claim 1 and wherein each of said laminae comprise two symmetrical pole piece elements joined at a reduced tip section by said electrically conductive and non-magnetic material and having a second gap on an opposite side of said pole piece elements from said reduced tip section to electrically isolate a left portion of each pole piece laminae from each right portion of each pole piece laminae.

8. The apparatus as in claim 7 and wherein each of the laminae has a recessed area to receive a photo-responsive element coupled to one side of one of said pole piece elements.

9. The apparatus as in claim 8 and wherein said electrical means further comprises an electrical energizing source and a bus bar interconnecting each of the laminae to the electrical energizing source.

10. The apparatus as in claim 9 and wherein said electrical energizing source is coupled in series with said photo-responsive element and each of said laminae.

11. The apparatus as in claim 10 and wherein the said electrical energizing source is a source of DC voltage.

12. The apparatus as in claim 10 and wherein said electrical energizing source is a source of AC voltage.

13. The apparatus as in claim 10 and wherein said electrical energizing source is a source of pulsed voltage of suitable wave form.

14. The apparatus as in claim 1 and wherein said electrical means further comprises photo-responsive means electrically connected in series with said laminae, and means for focusing an image of the graphic information from the original onto said photo-responsive means.

15. The apparatus as in claim 14 and wherein said photo-responsive means is a single photo-responsive element extending laterally across the copying head.

16. The apparatus as in claim 15 and wherein said photo-responsive means has a higher conductivity in a direction of a plane of the laminae than in any other direction.

17. The apparatus as in claim 15 and wherein said photo-responsive means is a doped single crystal cadmium sulfide material.

18. The apparatus as in claim 15 and wherein said photo-responsive means is a vacuum deposited layer of cadmium sulfide material of suitable composition.

19. The apparatus as in claim 15 and wherein said photo-responsive means is of a photo-transistor material.

20. The apparatus as in claim 1 and further comprising fixer means for fixing the information onto the receiving surface.

21. The apparatus as in claim 1 and further comprising motor drive means for moving in synchronization the original across said electrical means, said surface means across said linear magnetic field, and said receiving surface in synchronism with said surface means.

22. The apparatus as in claim 1 wherein said laminae are of a material selected from a group consisting of silicon iron, nickel alloys, and cobalt iron alloys.

23. The apparatus as in claim 1 and wherein each of the laminae are separated from each other by a sheet of electrical insulating material.

24. The apparatus as in claim 1 and where each of the laminae are separated from each other by an electrically insulating lacquer.

25. A method of imaging, for recording graphic information from a source of information onto a receiving surface, comprising:
 (a) providing a magnetic field;
 (b) shaping said magnetic field to a substantially linear configuration to provide a line with a uniform magnetic intensity throughout its length for any instant of time, said shaping including passing the magnetic field through a stack containing a plurality of magnetically permeable and electrically conductive laminae insulated from each other and formed with a gap portion which is bridged by an electrically conductive and non-magnetic element, so that said line is disposed along said gap portion;
 (c) varying the intensity of portions of said magnetic field along said line in accordance with information contained on a corresponding portion of the information source to obtain magnetic information;
 (d) disposing surface means adjacent to said gap portion in juxtaposition to said linear magnetic field, said surface means receiving and recording the magnetic information provided by said linear magnetic field;
 (e) disposing magnetically attractable toner material in magnetically attractable relationship to said surface means;
 (f) transferring the toner material to said surface means in quantity corresponding to magnetic field intensity variations recorded on said surface means to obtain a toner pattern;
 (g) transferring said toner pattern to the receiving surface to form a graphic record thereon.

26. The method as in claim 25 and wherein said step of varying the intensity of the magnetic field further comprises:
 (a) forming a series circuit between a photo-responsive means, an energy source, and each of the laminae, and
 (b) focusing an image of the graphic information onto the photo-responsive means to cause a current to pass through the electrically conductive and non-magnetic element at the gap portion corresponding to light and shade pattern of the image.

27. The method as in claim 25 and further comprising fixing the toner pattern onto the receiving surface.

* * * * *